United States Patent
Haberkamp et al.

(10) Patent No.: US 12,427,457 B2
(45) Date of Patent: Sep. 30, 2025

(54) ADHESIVE ALLOYS AND FILTER MEDIAS INCLUDING SUCH ADHESIVE ALLOYS

(71) Applicant: Cummins Filtration IP, Inc., Columbus, IN (US)

(72) Inventors: William C. Haberkamp, Cookville, TN (US); Kan Wang, Peachtree City, GA (US)

(73) Assignee: Cummins Filtration IP, Inc., Columbus, IN (US)

( * ) Notice: Subject to any disclaimer, the term of this patent is extended or adjusted under 35 U.S.C. 154(b) by 841 days.

(21) Appl. No.: 17/231,691

(22) Filed: Apr. 15, 2021

(65) Prior Publication Data

US 2021/0229011 A1     Jul. 29, 2021

Related U.S. Application Data

(63) Continuation of application No. PCT/US2019/056078, filed on Oct. 14, 2019.

(Continued)

(51) Int. Cl.
    *B01D 39/16*      (2006.01)
    *B32B 5/02*      (2006.01)
(Continued)

(52) U.S. Cl.
    CPC ............ *B01D 39/163* (2013.01); *B32B 5/022* (2013.01); *B32B 5/268* (2021.05); *B32B 7/12* (2013.01);
(Continued)

(58) Field of Classification Search
CPC ....... B01D 39/163; B32B 5/268; B32B 5/022; B32B 7/12; B32B 37/1207;
(Continued)

(56) References Cited

U.S. PATENT DOCUMENTS 3,878,014 A    4/1975   Melead
4,433,024 A    2/1984   Eian
(Continued)

FOREIGN PATENT DOCUMENTS

CN      101563422 A    10/2009
CN      105729918 A    7/2016
(Continued)

OTHER PUBLICATIONS

Notice of Preliminary Rejection issued for Korean Patent Application No. 10-2021-7011010, dated Mar. 16, 2023.
(Continued)

*Primary Examiner* — Youngsul Jeong
(74) *Attorney, Agent, or Firm* — Foley & Lardner LLP

(57) ABSTRACT

Embodiments described herein relate generally to adhesive alloys and their use in filter media, and in particular to adhesive alloys that can be melt blown onto a filter media layer, and which are thermally activated to bond the filter media layer to another filter media layer. An adhesive alloy is provided. A thermally activated adhesive has a first melting temperature. A polymer has a second melting temperature greater than the first melting temperature. A ratio of the thermally activated adhesive in the adhesive alloy is in a range of 5 wt % to 70 wt %.

14 Claims, 6 Drawing Sheets

Related U.S. Application Data

(60) Provisional application No. 62/746,167, filed on Oct. 16, 2018.

(51) Int. Cl.
| | |
|---|---|
| *B32B 5/26* | (2006.01) |
| *B32B 7/12* | (2006.01) |
| *B32B 37/12* | (2006.01) |
| *B32B 37/24* | (2006.01) |
| *C09J 167/02* | (2006.01) |
| *C09J 175/04* | (2006.01) |
| *D04H 1/55* | (2012.01) |
| *D04H 1/551* | (2012.01) |
| *D04H 1/58* | (2012.01) |
| *D04H 1/587* | (2012.01) |
| *D04H 3/011* | (2012.01) |
| *D04H 3/12* | (2006.01) |

(52) U.S. Cl.
CPC ...... *B32B 37/1207* (2013.01); *B32B 37/1284* (2013.01); *B32B 37/24* (2013.01); *C09J 167/02* (2013.01); *C09J 175/04* (2013.01); *D04H 1/55* (2013.01); *D04H 1/551* (2013.01); *D04H 1/587* (2013.01); *D04H 3/011* (2013.01); *D04H 3/12* (2013.01); *B01D 2239/0618* (2013.01); *B01D 2239/0622* (2013.01); *B01D 2239/0668* (2013.01); *B01D 2239/083* (2013.01); *B01D 2239/10* (2013.01); *B32B 2037/123* (2013.01); *B32B 2250/03* (2013.01); *B32B 2250/20* (2013.01); *B32B 2262/0284* (2013.01); *B32B 2262/0292* (2013.01); *B32B 2305/28* (2013.01); *B32B 2367/00* (2013.01); *B32B 2375/00* (2013.01)

(58) Field of Classification Search
CPC .... B32B 37/1284; B32B 37/24; C09J 167/02; C09J 175/04; D04H 1/55; D04H 1/551; D04H 1/587; D04H 3/011; D04H 3/12
See application file for complete search history.

(56) References Cited

U.S. PATENT DOCUMENTS

| | | | |
|---|---|---|---|
| 4,547,420 A | 10/1985 | Krueger et al. | |
| 4,636,429 A | 1/1987 | Morell et al. | |
| 4,650,479 A | 3/1987 | Insley | |
| 4,681,801 A | 7/1987 | Eian et al. | |
| 4,714,647 A | 12/1987 | Shipp et al. | |
| 4,729,371 A | 3/1988 | Krueger et al. | |
| 4,731,215 A | 3/1988 | Schwarz | |
| 4,734,311 A | 3/1988 | Sokolowski | |
| 4,749,423 A | 6/1988 | Vaalburg et al. | |
| 4,795,668 A | 1/1989 | Krueger et al. | |
| 4,824,451 A | 4/1989 | Vogt et al. | |
| 4,863,779 A | 9/1989 | Daponte | |
| 4,868,032 A | 9/1989 | Eian et al. | |
| 4,908,263 A | 3/1990 | Reed et al. | |
| 4,910,064 A | 3/1990 | Sabee | |
| 5,010,165 A | 4/1991 | Pruett et al. | |
| 5,176,952 A | 1/1993 | Joseph et al. | |
| 5,200,246 A | 4/1993 | Sabee | |
| 5,213,881 A | 5/1993 | Timmons et al. | |
| 5,219,633 A | 6/1993 | Sabee | |
| 5,230,701 A | 7/1993 | Meyer et al. | |
| 5,232,770 A | 8/1993 | Joseph | |
| 5,238,733 A | 8/1993 | Joseph et al. | |
| 5,271,883 A | 12/1993 | Timmons et al. | |
| 5,308,691 A | 5/1994 | Lim et al. | |
| 5,366,792 A | 11/1994 | Shirayanagi et al. | |
| 5,369,858 A | 12/1994 | Gilmore et al. | |
| 5,652,041 A | 7/1997 | Buerger et al. | |
| 5,714,067 A | 2/1998 | Sorrick | |
| 5,733,635 A | 3/1998 | Terakawa et al. | |
| 5,759,927 A | 6/1998 | Meeker | |
| 5,773,375 A | 6/1998 | Swan et al. | |
| 5,783,011 A | 7/1998 | Barboza et al. | |
| 5,961,904 A | 10/1999 | Swan et al. | |
| 6,054,205 A | 4/2000 | Newman et al. | |
| 6,057,256 A | 5/2000 | Krueger et al. | |
| 6,214,146 B1 | 4/2001 | Merker | |
| 6,230,901 B1 | 5/2001 | Ogata et al. | |
| 6,391,131 B1 | 5/2002 | Newman et al. | |
| 6,503,856 B1 | 1/2003 | Broadway et al. | |
| 6,514,325 B2 | 2/2003 | Cox et al. | |
| 6,524,360 B2 | 2/2003 | Cox et al. | |
| 6,534,151 B2 | 3/2003 | Merker | |
| 6,554,881 B1 | 4/2003 | Healey | |
| 6,592,960 B1 | 7/2003 | Suzuki et al. | |
| 6,746,517 B2 * | 6/2004 | Benson | B01D 46/02 55/528 |
| 6,858,057 B2 | 2/2005 | Healey | |
| 6,860,917 B2 | 3/2005 | Henrichsen et al. | |
| 6,900,148 B2 | 5/2005 | Yoneda et al. | |
| 6,932,923 B2 | 8/2005 | Nguyen | |
| 7,309,372 B2 | 12/2007 | Kahlbaugh et al. | |
| 7,947,359 B2 | 5/2011 | Suzuka et al. | |
| 7,981,509 B2 | 7/2011 | Kalayci | |
| 8,128,779 B2 | 3/2012 | Ho et al. | |
| 8,148,475 B2 | 4/2012 | Vedula et al. | |
| 8,172,092 B2 | 5/2012 | Green et al. | |
| 8,206,484 B2 | 6/2012 | Claasen et al. | |
| 8,247,069 B2 | 8/2012 | Kalayci | |
| 8,349,103 B2 | 1/2013 | Suzuka et al. | |
| 8,365,862 B2 | 2/2013 | Coates et al. | |
| 8,512,569 B2 | 8/2013 | Eaton et al. | |
| 8,679,217 B2 | 3/2014 | Chi et al. | |
| 8,679,218 B2 | 3/2014 | Wertz et al. | |
| 8,802,002 B2 | 8/2014 | Berrigan et al. | |
| 8,906,815 B2 | 12/2014 | Moore et al. | |
| 8,939,295 B2 | 1/2015 | Ward et al. | |
| 8,999,867 B2 | 4/2015 | Van Paridon et al. | |
| 9,068,076 B2 | 6/2015 | Blayne et al. | |
| 9,249,527 B2 | 2/2016 | Lee et al. | |
| 9,255,349 B2 | 2/2016 | Van Paridon et al. | |
| 9,447,523 B2 | 9/2016 | Fedorova et al. | |
| 9,474,994 B2 | 10/2016 | Gao et al. | |
| 9,475,034 B2 | 10/2016 | Vincent et al. | |
| 9,663,883 B2 | 5/2017 | Bond et al. | |
| 9,771,675 B2 | 9/2017 | Altshuler et al. | |
| 2007/0042665 A1 | 2/2007 | Peng et al. | |
| 2007/0110949 A1 * | 5/2007 | Abrams | B32B 37/12 428/97 |
| 2008/0017038 A1 | 1/2008 | Wu | |
| 2008/0132591 A1 | 6/2008 | Lawrence et al. | |
| 2009/0064648 A1 | 3/2009 | Chi et al. | |
| 2010/0047469 A1 * | 2/2010 | Hilmer | B05D 3/0446 174/209 |
| 2010/0139224 A1 | 6/2010 | Lim et al. | |
| 2010/0203305 A1 | 8/2010 | Takeda | |
| 2011/0045261 A1 | 2/2011 | Sellars | |
| 2011/0114554 A1 | 5/2011 | Li et al. | |
| 2011/0183567 A1 | 7/2011 | Vedula et al. | |
| 2011/0210060 A1 | 9/2011 | Green et al. | |
| 2011/0210061 A1 | 9/2011 | Li et al. | |
| 2011/0232002 A1 | 9/2011 | Wiessner | |
| 2012/0190264 A1 | 7/2012 | Mahammad et al. | |
| 2012/0208031 A1 | 8/2012 | Park | |
| 2012/0255662 A1 | 10/2012 | Green | |
| 2013/0037481 A1 | 2/2013 | Lalouch et al. | |
| 2014/0024279 A1 | 1/2014 | Berrigan et al. | |
| 2014/0127960 A1 | 5/2014 | Kim et al. | |
| 2015/0125696 A1 | 5/2015 | Fedorova et al. | |
| 2015/0129486 A1 | 5/2015 | Ward et al. | |
| 2015/0360157 A1 | 12/2015 | Hwang et al. | |
| 2016/0136924 A1 | 5/2016 | Lee et al. | |
| 2016/0296871 A1 * | 10/2016 | Scope | B01D 46/0028 |
| 2016/0298266 A1 | 10/2016 | Zillig et al. | |
| 2016/0341119 A1 | 11/2016 | Fedorova et al. | |

(56) References Cited

U.S. PATENT DOCUMENTS

2017/0304755 A1    10/2017   Bansal et al.
2018/0134855 A1    5/2018   Vielsack

FOREIGN PATENT DOCUMENTS

| KR | 100491844 B1 | 5/2005 |
|----|--------------|--------|
| KR | 10-2015-0125139 | 11/2015 |
| KR | 1020160126416 A | 11/2016 |
| WO | WO-2016/188517 A1 | 5/2016 |
| WO | WO-2017/184982 A1 | 10/2017 |
| WO | WO-2018/045932 A1 | 3/2018 |

OTHER PUBLICATIONS

First Office Action for CN Appl. No. 201980067313.X, dated Jan. 5, 2022, 6 pages.
International Search Report and Written Opinion issued for PCT Application No. PCT/US2019/056078, issued Dec. 23, 2019, 9 pages.
Second Notice of Preliminary Rejection issued for Korean Patent Application No. 10-2021-7011010 issued Sep. 25, 2023, 5 pages plus translation.

* cited by examiner

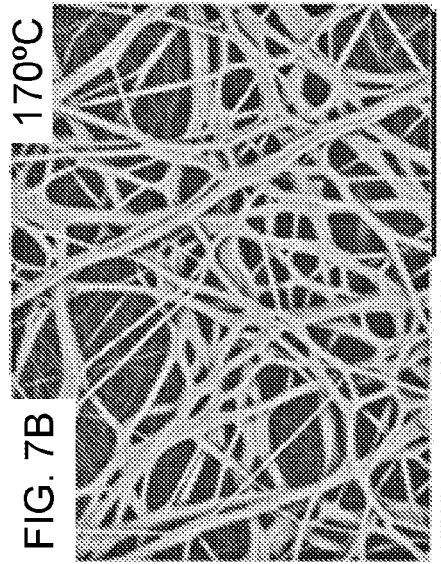
FIG. 7A Original
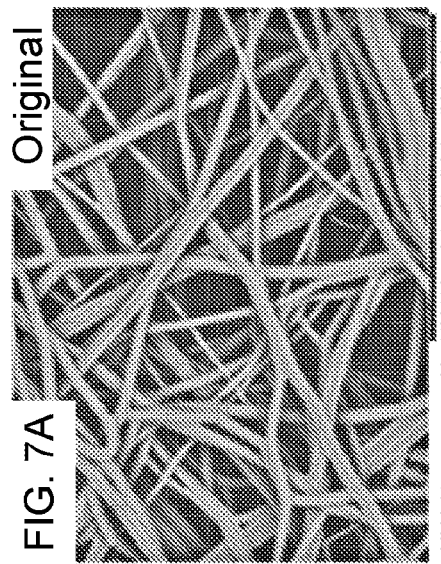
FIG. 7B 170°C
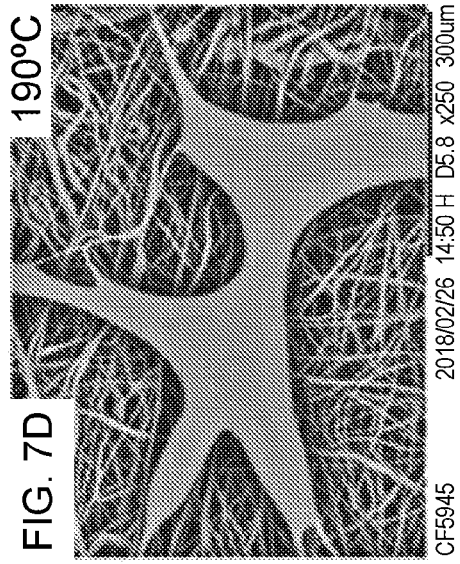
FIG. 7C 180°C
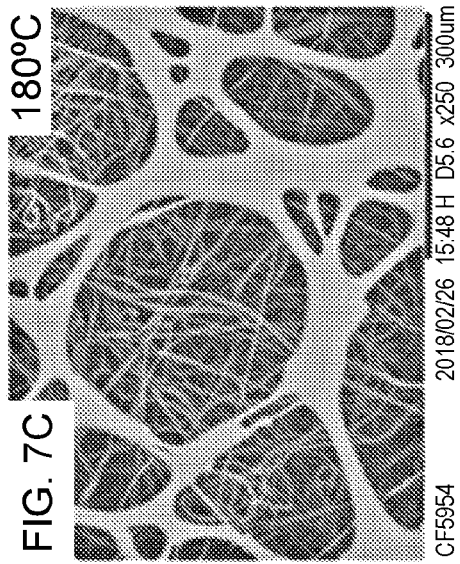
FIG. 7D 190°C

ADHESIVE ALLOYS AND FILTER MEDIAS INCLUDING SUCH ADHESIVE ALLOYS

CROSS-REFERENCE TO RELATED APPLICATIONS

The present application is a continuation of PCT Application No. PCT/US2019/056078, filed Oct. 14, 2019, claims priority to and the benefit of U.S. Provisional Patent Application No. 62/746,167 filed on Oct. 16, 2018. The contents of these applications are hereby incorporated by reference in their entirety.

TECHNICAL FIELD

The present disclosure relates generally to methods for fabricating filter media for filter elements and adhesives used therein.

BACKGROUND

Nonwovens, comprising randomly or sometimes directionally oriented polymer fibers, are used in applications ranging from disposable wipes to filter media. Some filter media include a plurality of filter media layers that are bonded together. Many conventional filter media use hot melt adhesives or laminates to bond the plurality of filter media layers. However, such hot melt laminates have poor surface finish and can also reduce filtration efficiency of the filter media by penetrating into and blocking pores of the filter media layers.

SUMMARY

Embodiments described herein relate generally to adhesive alloys and their use in filter media, and in particular to adhesive alloys that can be melt blown onto a filter media layer, and which are thermally activated to bond the filter media layer to another filter media layer.

In a first set of embodiments, an adhesive alloy comprises a thermally activated adhesive having a first melting temperature, and a polymer having a second melting temperature greater than the first melting temperature. A ratio of the thermally activated adhesive in the adhesive alloy is in a range of 5 wt % to 70 wt %.

In another set of embodiments, a filter media comprises a first filter media layer, a second filter media layer, and at least one adhesive alloy layer comprising an adhesive alloy disposed between the first filter media layer and the second filter media layer. The adhesive alloy comprises a thermally activated adhesive having a first melting temperature, and a polymer having a second melting temperature greater than the first melting temperature. A ratio of the thermally activated adhesive in the adhesive alloy is in a range of 5 wt % to 70 wt %.

In still another set of embodiments, a method for forming a filter media, comprises mixing a first amount of a thermally activated adhesive with a second amount of a polymer to form a mixture. The mixture is at least one of dry blended or compounded to form an adhesive alloy. The adhesive allow is melt blown onto a surface of a first filter media layer to form a non-woven adhesive alloy layer disposed on the first filter media layer. At least the adhesive alloy layer is heated to a temperature greater than a softening temperature of the adhesive alloy but lower than a melting temperature of the adhesive alloy. A second filter media layer is disposed over the heated adhesive alloy layer. The adhesive alloy layer is cooled to a temperature below the softening temperature of the adhesive alloy causing the adhesive alloy layer to harden and bond to each of the first filter media layer and the second filter media layer. A ratio of the thermally activated adhesive in the adhesive alloy is in a range of 5 wt % to 70 wt %.

In yet another set of embodiments, a filter media is formed by a process comprising the steps of mixing a first amount of a thermally activated adhesive with a second amount of a polymer to form a mixture. The mixture is at least one of dry blended or compounded to form an adhesive alloy. The adhesive allow is melt blown onto a surface of a first filter media layer to form a non-woven adhesive alloy layer disposed on the first filter media layer. At least the adhesive alloy layer is heated to a temperature greater than a softening temperature of the adhesive alloy but lower than a melting temperature of the adhesive alloy. A second filter media layer is disposed over the heated adhesive alloy layer. The adhesive alloy layer is cooled to a temperature below the softening temperature of the adhesive alloy causing the adhesive alloy layer to harden and bond to each of the first filter media layer and the second filter media layer. A ratio of the thermally activated adhesive in the adhesive alloy is in a range of 5 wt % to 70 wt %.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

FIG. 7A-7D are SEM images of an adhesive alloy layer including TPU and poly(butylene terephthalate) (PBT) that is melt blown and cooled to form a non-woven adhesive alloy mat on a fiber media layer (FIG. 7A); the adhesive alloy layer heated to a temperature of 170 degrees Celsius (FIG. 7B); the adhesive alloy layer heated to a temperature of 180 degrees Celsius (FIG. 7C); and the adhesive alloy layer heated to a temperature of 190 degrees Celsius.

Figure 1:
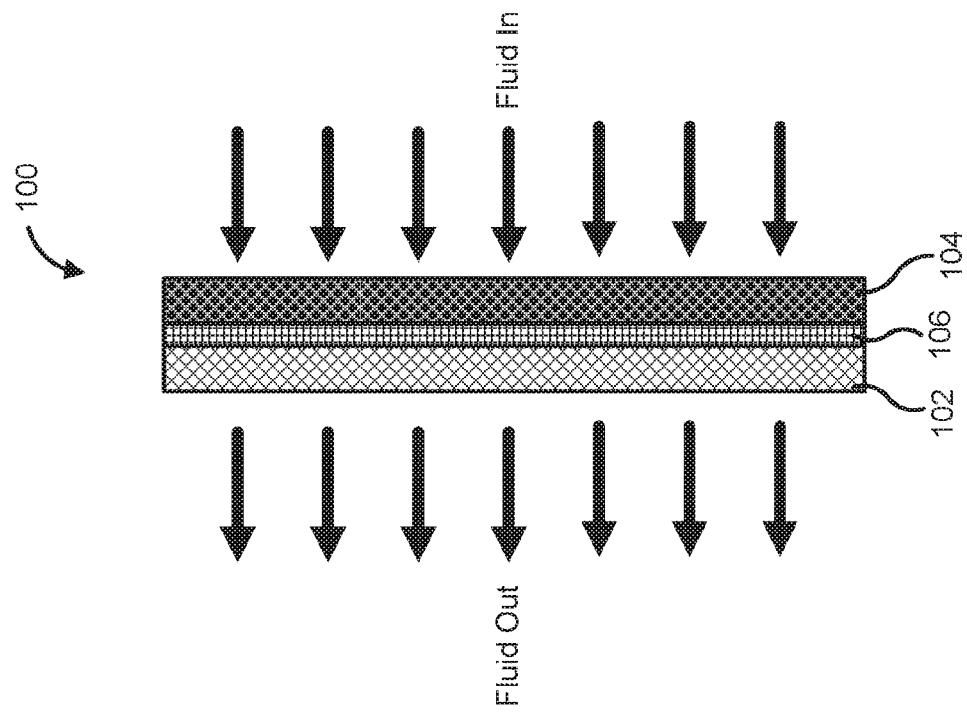
FIG. 1 is a side cross-section view of a filter media, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to adhesive alloys and their use in filter media, and in particular to adhesive alloys that can be melt blown onto a filter media layer, and which are thermally activated to bond the filter media layer to another filter media layer.

Some filter media include a plurality of filter media layers that are bonded together. Many conventional filter media use hot melt lamination to bond the plurality of filter media layers. However, such hot melt laminates have poor surface finish and can also reduce filtration efficiency of the filter media by penetrating into and blocking pores of the filter media layers.

Embodiments of the adhesive alloys and filter media including such adhesive alloys described herein may be provide a number of benefits including, for example: (1) providing a thermally activated adhesive alloy that can be selectively activated to allow bonding of filter media layers; (2) allowing melt blowing of the adhesive alloy onto a filter media layer or another substrate, therefore eliminating use of hot melt glues and associated equipment; (3) allowing formation of a high porosity non-woven adhesive alloy mat on the filter media layer which has negligible impact on the pressure drop across or the filtration performance of the filter media; and (4) providing greater control over adhesive alloy deposition while using lesser amount of material, thereby reducing cost.

In some embodiments, an adhesive alloy which may be used as an adhesive alloy for bonding a plurality of filter media layers includes a thermally activated adhesive having a first melting temperature. Any suitable thermally activated adhesive may be used such as, for example, TPU, acrylonitrile butadiene styrene (ABS), acrylic, polyimide, cellulose acetate, nylon, etc. In particular embodiments, the thermally activated adhesive includes TPU. In such embodiments, the first melting temperature is about 130 degrees Celsius to 180 degrees Celsius (e.g., about 130, 140, 150, 160, 170 or 180 degrees Celsius inclusive of all ranges and values therebetween).

The adhesive alloy also includes a polymer having a second melting temperature greater than the first melting temperature. The polymer may include any suitable polymer such as, for example, polyimide, aliphatic polyamide, aromatic polyamide, polysulfone, cellulose acetate, polyether sulfone, polybenzimidazole, polyetherimide, polyacrylonitrile, poly(ethylene terephthalate), polypropylene, polyaniline, poly(ethylene oxide), poly(ethylene naphthalate), poly(butylene terephthalate), styrene butadiene rubber, polystyrene, poly(vinyl chloride), poly(vinyl alcohol), poly(vinylidene fluoride), poly(vinyl butylene), polyphenylene sulfide (PPS), liquid crystal polymer (e.g., Kevlar, Vectran, Zenite 5145L, etc.), copolymers or derivatives thereof. In particular embodiments, the polymer includes a polyester. In one embodiment, the polyester includes PBT. In such embodiments, the second melting temperature is about 200 degrees Celsius to 320 degrees Celsius (e.g., 200, 220, 240, 260, 280, 300 or 320 degrees Celsius inclusive of all ranges and values therebetween). In some embodiments, the polymer may include any suitable polymer that can be melt blown to form a non-woven web or mat, for example, to form a filter media layer.

A ratio of the thermally activated adhesive in the adhesive alloy is in a range of 5 wt % to 70 wt % (e.g., 5 wt %, 10 wt %, 15 wt %, 20 wt %, 25 wt %, 30 wt %, 35 wt %, 40 wt %, 45 wt %, 50 wt %, 55 wt %, 60 wt %, 65 wt % or 70 wt % thermally activated adhesive inclusive of all ranges and values therebetween). For example, in a particular embodiment, the adhesive alloy may include 5 wt % to 70 wt % TPU with the remaining being PBT. The adhesive alloy may have an alloy melting temperature greater than the first melting temperature but less than the second melting temperature. The adhesive alloy melting temperature is based on the proportion of the thermally activated adhesive relative to the polymer in the adhesive alloy. For example, in embodiments in which the adhesive alloy includes 5 wt % to 70 wt % TPU with the remaining being PBT, the alloy melting temperature is between the melting temperature of TPU and the melting temperature of PBT depending upon the amount of TPU mixed with PBT.

In some embodiments, the adhesive alloy has an alloy softening temperature less than the alloy melting temperature such that heating the adhesive alloy to the alloy softening temperature causes the adhesive alloy to be adhesively bondable to a substrate (e.g., a filter media layer). In other words, the adhesive alloy may be formulated such that heating the adhesive alloy to the softening temperature thereof activates the adhesive property of the adhesive alloy without completely melting the adhesive alloy. This results in minimal reflow of the adhesive alloy such that the adhesive alloy substantially retains a shape thereof while being able to bond to the substrate (e.g., a filter media layer).

Thus, mixing the thermally activated adhesive with the polymer yields the adhesive alloy that has a lower and broader softening point, and possesses a tacky or adhesive characteristic. However, the adhesive alloy still retains melting ability of the polymer included therein, allowing the adhesive alloy to be melt blown into a non-woven web or mat. Furthermore, the adhesive alloy may have a higher tensile strength than the polymer included therein.

In some embodiments, the adhesive alloy described herein may be used in a filter media as a bonding layer. For example, FIG. 1 is a side cross-section view of a filter media 100, according to an embodiment. The filter media 100 may be configured to remove particulate matter from a fluid. The filter media 100 includes a first filter media layer 102 and a second filter media layer 104 bonded together by an adhesive alloy layer 106 disposed therebetween. The adhesive alloy layer 106 includes the adhesive alloy, previously described herein. The first filter media layer 102 may be structured to filter particulate matter (e.g., soot, ash, dust, organic or inorganic particles, etc.) from a fluid (e.g., air, water, fuel such as diesel or gasoline, air/fuel mixture, lubricant or any other fluid).

The first filter media layer 102 may be structured to have a predetermined first porosity so as to provide a predetermined first flow rate of the fluid therethrough. In some embodiments, the porosity of the first filter medial layer 102 defines a porosity corresponding to filtration efficiency of the filter media 100. In particular embodiments, the first filter media layer 102 may have a permeability of 5 cfm to 1,000 cfm, a basis weight of 5 grams per square meter (gsm) to 200 gsm and a fiber size (e.g., diameter) of each of the plurality of fibers forming the fibers of 0.5 μm to 50 μm.

The first filter media layer 102 may be formed from any suitable material, for example, polyimide, aliphatic polyamide, aromatic polyamide, polysulfone, cellulose acetate, polyether sulfone, polybenzimidazole, polyetherimide, polyacrylonitrile, poly(ethylene terephthalate), polypropylene, polyaniline, poly(ethylene oxide), poly(ethylene naphthalate), poly(butylene terephthalate) (PBT), styrene butadiene rubber, polystyrene, poly(vinyl chloride), poly(vinyl alcohol), poly(vinylidene fluoride), poly(vinyl butylene), polyphenylene sulfide (PPS), liquid crystal polymer (e.g., Kevlar, Vectran, Zenite 5145L, etc.), copolymers or derivatives thereof, or a combination thereof.

In particular embodiments, the first filter media layer 102 may also include 0 wt % to 10 wt % of the thermally activated adhesive and a polymer. For example, the first filter media layer 102 includes 0 wt % to −10 wt % TPU with the remaining being a polyester. The amount of thermally activated adhesive in the first filter media layer 102 may be less than an amount of the thermally activated adhesive included in the adhesive alloy, such that a first media layer melting temperature or a first media layer softening temperature of the first filter media layer 102 is greater than the alloy melting temperature and the alloy softening temperature, respectively. In some embodiments, the polymer may be the same polymer included in the adhesive alloy layer 106 (e.g., poly(ethylene terephthalate) (PET) or PBT). In other embodiments, the polymer used to form the first filter media layer 102 is different from the polymer included in the adhesive alloy layer 106.

The first filter media layer 102 may be formed using any suitable process. In particular embodiments, the first filter media layer 102 includes a non-woven mat formed via a melt blowing process. In other embodiments, the first filter media layer 102 may be formed using melt spinning, solution spinning, wet laying, dry laying, weaving, any other suitable process or combinations thereof.

The second filter medial layer 104 may be substantially similar to the first filter media layer 102 or different therefrom. In some embodiments, the second filter media layer may include, for example, a scrim layer. Suitable scrim layers may include spun bonded nonwovens, melt blown nonwovens, needle punched nonwovens, spun laced nonwovens, wet laid nonwovens, resin-bonded nonwovens, woven fabrics, knit fabrics, aperture films, paper, and combinations thereof. In particular embodiments, the second filter media layer 104 may be formed from cellulose. In some embodiments, the second filter media layer 104 may also include a melt blown non-woven mat.

The adhesive alloy layer 106 is formed from the adhesive alloy that includes the thermally activated adhesive having the first melting temperature, and the polymer having the second melting temperature greater than the first melting temperature such that a ratio of the thermally activated adhesive in the adhesive alloy is in a range of 5 wt % to 70 wt %. In particular embodiments, the adhesive alloy layer 106 may include a non-woven mat of the adhesive alloy. For example, the adhesive alloy layer 106 may include a plurality of fibers of the adhesive alloy melt blown onto a surface of the first filter media layer 102 or the second filter media layer 104, to form a non-woven mat of the adhesive alloy, and allowed to solidify to form the adhesive alloy layer 106 disposed on the first filter media layer 102. In some embodiments, as the melt blown adhesive alloy fibers in the adhesive alloy layer 106 solidify, they may bond to the adhesive alloy layer 106.

The fibers of the adhesive alloy layer 106 may have a cross-section (e.g., diameter) in a range of 1 micron to 30 microns (e.g., 1, 2, 3, 4, 5, 10, 15, 20, 25 or 30 microns inclusive of all ranges and values therebetween). The adhesive alloy layer 106 may have thickness of less than 100 microns. Furthermore, a porosity of the adhesive alloy layer 106 may be an order of magnitude greater than the porosity of the first filter media layer 102 or the second filter media layer 104 so that the adhesive alloy layer 106 has a high permeability and thus, has negligible impact on flow rate of the fluid through the filter media 100.

To form the filter media 100, at least the adhesive alloy layer 106 may be heated to a temperature at or above the alloy softening temperature but below the alloy melting temperature of the adhesive alloy so as to thermally activate the adhesive alloy. As previously described herein, heating the adhesive alloy layer 106 to the adhesive alloy softening temperature increases the tackiness or adhesiveness of the adhesive alloy layer 106 without completely melting the adhesive alloy fibers included in the adhesive alloy layer 106 such that the adhesive alloy layer 106 substantially retains it morphology and shape. The second filter media layer 104 is then positioned on the thermally activated adhesive alloy layer 106 (or alternatively, the first filter media layer 102 is positioned on the thermally activated adhesive alloy layer 106 in embodiments in which the adhesive alloy layer 106 is initially deposited on the second filter media layer 104) and pressure may be applied to cause the second filter media layer 104 to adhere to the adhesive alloy layer 106. Cooling of the adhesive alloy layer 106 to below the alloy softening temperature bonds the second filter media layer 104 to the adhesive alloy layer 106 and thereby, the first filter media layer 102.

The adhesive alloy layer 106 may causes a negligible drop in flow rate or restriction of a fluid through the filter media 100 after thermally activated bonding, for example the air permeability may drop less than 2 cubic feet per minute (cfm) or 1 cfm with addition of the adhesive layer. For example, a drop in air permeability of the filter media 100 due to the inclusion of the adhesive alloy layer 106 may be less than about 5% of an air permeability of the filter media 100 if the adhesive alloy layer 106 was not present. Furthermore, the adhesive alloy layer 106 may have a thickness of less than 100 microns, as previously described herein, such that the adhesive bonding layer is virtually invisible relative to hot melt adhesives conventionally used to bond filter media layers. The adhesive alloy layer 106 may also provide a more uniform bond relative to conventional hot melt adhesives.

Figure 2:
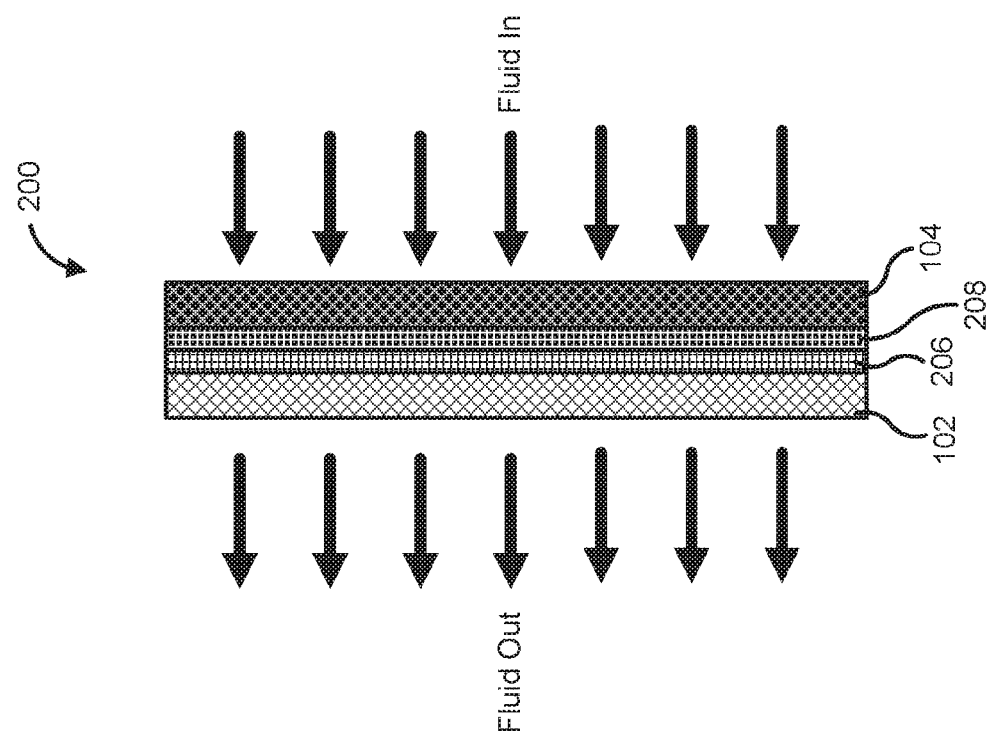
FIG. 2 is a side cross-section view of a filter media, according to another embodiment.

FIG. 2 is a side cross-section view of a filter media 200, according to another embodiment. The filter media 200 includes the first filter media layer 102 and the second filter media layer. A first adhesive alloy layer 206, and a second adhesive alloy layer 208 is disposed between the first and second filter media layers 102 and 104. The first adhesive alloy layer 206 and the second adhesive alloy layer 208 may be substantially similar to the adhesive alloy layer 106. However, the first adhesive alloy layer 206 may include first amount of the thermally activated adhesive, and the second adhesive alloy layer 108 may include a second amount of the thermally activated adhesive which is greater than the first amount of the thermally activated adhesive. For example, the first adhesive alloy layer 206 may include 10 wt % of the thermally activated adhesive (e.g., TPU) and the second adhesive layer may include 20 wt % of the thermally activated adhesive. While shown as including the two adhesive alloy layers 206 and 208, in other embodiments, the filter media 200 or any other filter media described herein may include any number of adhesive alloy layers. In such embodiments, each successive filter media layer may have an increasing amount of the thermally activated adhesive therein (e.g., a step wise increase in the amount of thermally activated adhesive in each layer included in the filter media).

Figure 3:
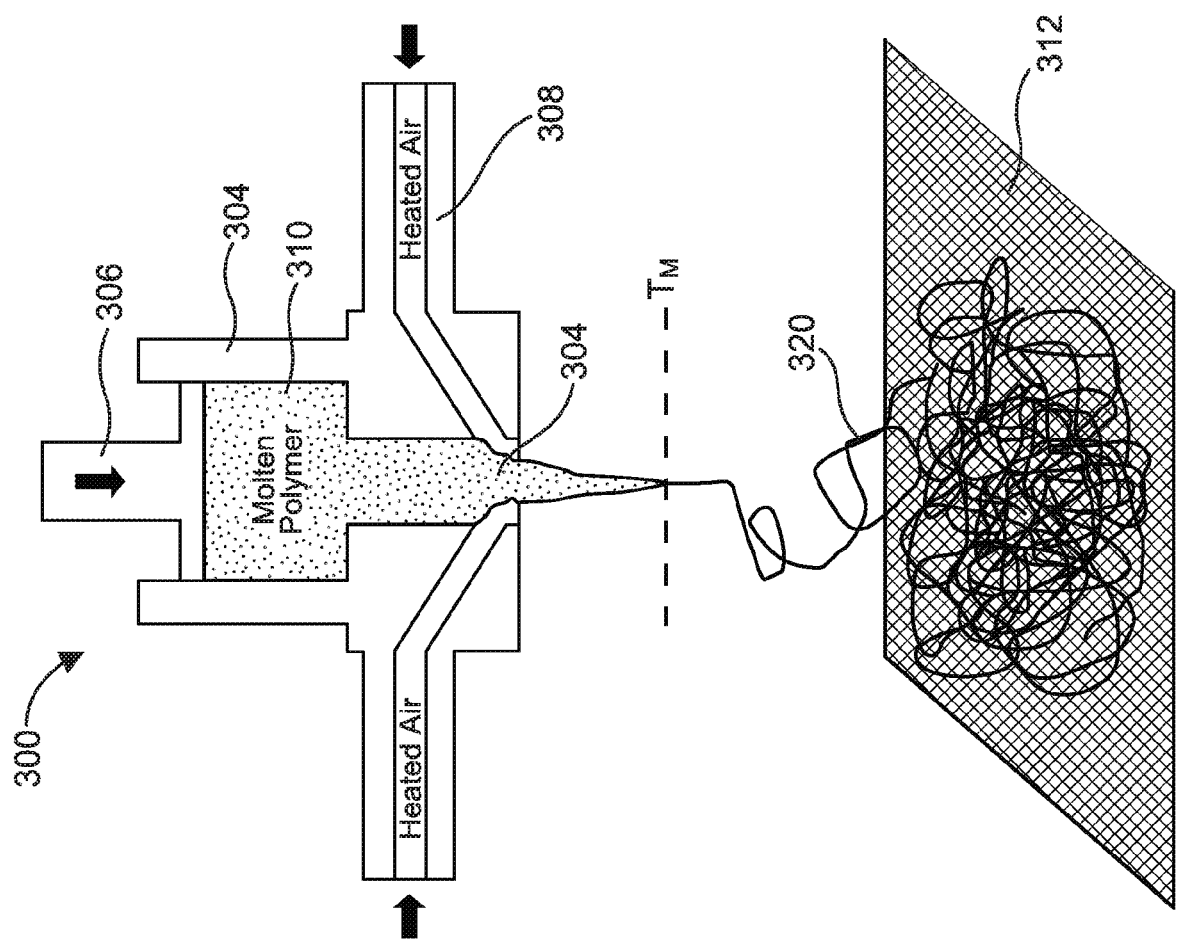
FIG. 3 is schematic illustration of melt blowing apparatus for melt blowing adhesive alloys described herein onto a surface of a filter media layer, according to an embodiment.

FIG. 3 is a schematic illustration of a melt blowing apparatus 300, according to an embodiment. The melt blowing apparatus 300 may be used to melt blow fibers of the adhesive alloy onto a substrate, for example, the first filter media layer 102 or the second filter media layer 104, to form a non-woven web (e.g., the adhesive alloy layer 106, 206, 208) of the adhesive alloy thereon. The melt blowing apparatus 300 comprises a melt blowing die 302. An adhesive alloy 310, for example, any of the adhesive alloys described herein, is disposed in an internal volume defined by the melt blowing die 302. The melt blowing die 302 defines an orifice 304, and a plunger 306 is configured to be selectively moved towards the orifice 304 so as to force melted adhesive alloy 310 out of the orifice 304 to form adhesive alloy fibers 320.

The melt blowing die 302 defines a pair of conduits 308 configured to deliver heated air to the orifice 304. The heated air or any other heated gas delivered to the orifice may be at a first predetermined temperature (e.g. in a range of 220 degrees Celsius to 260 degrees Celsius) sufficient to maintain the molted state of the adhesive alloy 310. The melted adhesive alloy stream is extruded out of the orifice 304 and travels towards a substrate 312 (e.g., a filter media layer), which is positioned below the orifice 304. A non-woven web of the adhesive alloy fibers 320 is formed on the substrate 312 to form an adhesive alloy layer. As the adhesive alloy layer formed from the adhesive alloy fibers solidifies on the substrate 312, the adhesive alloy layer may bond to the substrate 312.

Figure 4:
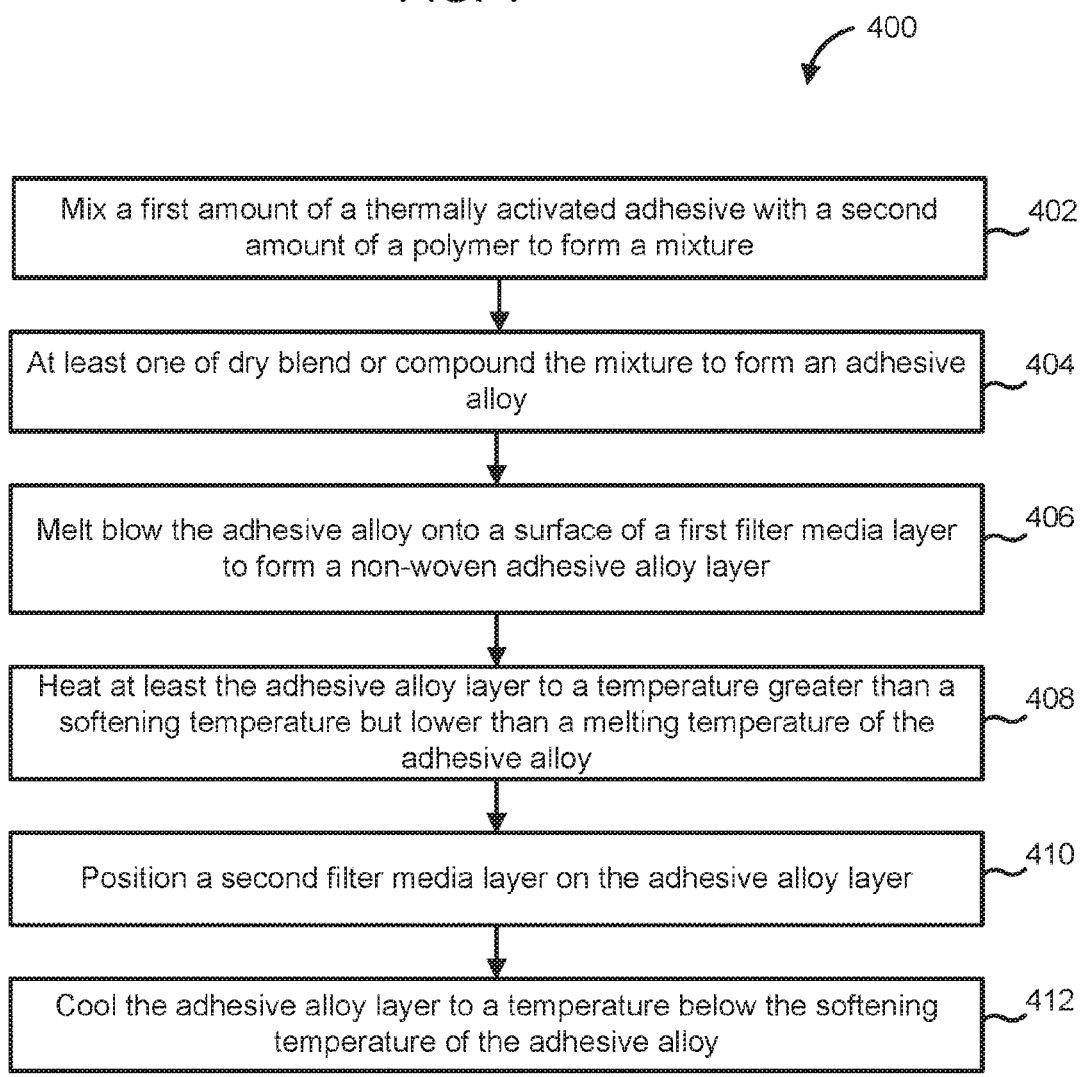
FIG. 4 is a schematic flow diagram of a method for forming a filter media, according to an embodiment.

FIG. 4 is a schematic flow diagram of a method 400 for forming a filter media (e.g., the filter media 100, 200), according to an embodiment. The method 400 includes mixing a first amount of a thermally activated adhesive with a second amount of a polymer to form a mixture, at 402. For example, pellets of the thermally activated adhesive may be mixed with pellets of the polymer to form the mixture. In a particular embodiment, the thermally activated adhesive includes a mixture or alloy of PBT and TPU.

At 404, the mixture is at least one of dry blended or compounded to form the adhesive alloy. As described herein, dry blending includes physically mixing pellets or particles of the thermally activated adhesive with pellets or particles of the polymer, for example, in a paddle or rotary mixer or a blender. As described herein, compounding includes physically mixing and then heating the mixture to a temperature above a melting temperature of each of the thermally activated adhesive and the polymer to form an adhesive alloy melt which solidifies on cooling to form the adhesive alloy.

At 406, the adhesive alloy is melt blown onto a surface of a first filter media layer to form a non-woven adhesive alloy layer. For example, the adhesive alloy is melt blown on to the first filter media layer 102 to form the adhesive alloy layer 106 thereon. At 408, at least the adhesive alloy layer (e.g., the adhesive alloy layer 106) is heated to a temperature greater than a softening temperature of the adhesive alloy but lower than a melting temperature thereof. In some embodiments, the softening temperature may be in a range of 175 degrees Celsius to 185 degrees Celsius (e.g., 175, 180 or 185 degrees Celsius). Heating the adhesive alloy layer activates the adhesiveness of the adhesive alloy, as previously described herein.

At 410, a second filter media layer (e.g., the second filter media layer 104) is positioned on the heated adhesive alloy layer. Pressure may be applied on the second and/or first adhesive layers to cause the adhesive alloy layer to adhere to the second filter media layer. In some embodiments, melt blowing the adhesive alloy fibers on the first filter media layer only forms the adhesive alloy layer thereon which is not yet adhered to the first filter medial layer. In such embodiments, the adhesive alloy layer adheres to each of the first and second filter medial layers at operation 410. At 412, the adhesive alloy layer is cooled to a temperature below the softening temperature of the adhesive alloy causing the adhesive alloy layer to harden and bond to the first and second filter media layers, thereby forming the filter media.

The following section describes various examples of adhesive alloys, methods of forming adhesive alloys, and adhesive alloy layers and filter media including the adhesive alloy. It should be appreciated that these examples are for illustrative purposes only and should not be construed as limiting the disclosure in any shape or form.

EXPERIMENTAL EXAMPLES

Forming a TPU/PBT Adhesive Alloy

A mixture of PBT and TPU is dry blended until well dispersed in a rotating mixer assembly with one or more paddle(s) to facilitate turnover of all material. Once blended, the mixture is loaded into a dehumidifying drier and dried at a temperature of 110 degrees Celsius for a minimum of 4 hours to form the adhesive alloy. The ratio of TPU in the adhesive alloy is 40 wt %.

Melt Blowing the Adhesive Alloy to Form Adhesive Alloy Fibers

The adhesive alloy is conveyed or placed into the feed hopper of an extruder with a barrier style feed screw designed for engineered polymers, having a Maddux mixer in the final section. The extruder has a 1.5" barrel and screw which rotates about 40-50 rpm with temperate zones ranging from 220 degrees Celsius in the first melting section to 230, 240, 250 and finally 260 degrees Celsius in the remaining progressive zones. The adhesive alloy exits the extruder at about 260 degrees Celsius fully molten and blended, and into a positive displacement pump rotating at about 15 revolutions per minute and delivering 150 cc per minute of the molten adhesive alloy to a melt blowing die.

The melt blowing die has an active width of about 0.75 meters with about 900 nozzles in a spinneret arranged in a straight line. The die body of the melt blowing die is set to a controlled temperature of about 260 degrees Celsius and the melted adhesive alloy flowing into the die is distributed by means of a coat hanger manifold located inside the die to be uniform across the width of the die spinneret. Melted adhesive alloy exits each spinneret nozzle, and on each side of the spinneret nozzles are heated air curtains or jets that attenuate the adhesive alloy melt to produce adhesive alloy fibers in a continuous but molten filament. The adhesive alloy flow rate is about 0.18 gram per minute per nozzle, the total air flow rate is about 120 liters per minute per cm and the air is heated to about 270 degrees Celsius. The adhesive alloy fibers produced vary in diameter from about 2 microns to 20 microns. The melt spun adhesive alloy fibers rapidly cool and collect, forming a mass of adhesive alloy fibers.

Forming Filter Media Using Adhesive Alloy as a Bonding Material

To form a filter media, the adhesive alloy fibers are directed toward, and form on the surface of a first filter media layer (e.g., a fibrous media). The first filter media layer may be produced in similar manner (i.e., via melt blowing) but without the mixture of the thermally activated adhesive, and is moving perpendicular in relationship to the adhesive alloy mat being formed. A filter media second layer is formed and cooled to a solidified state and is composed of the same or similar PBT resin as used in the first filter media layer, with the adhesive alloy fibers now sticking and or clinging to its surface. The second filter media layer may contain an amount of TPU or other PBT, PBT resin or modifiers but in a small amount less than about 5 wt % to 10 wt % such that its properties and specifically softening temperature remain higher than the adhesive alloy layer.

The first and second filter media layers have very different fiber diameter, weight, structure and properties that are advantageous to the intended filtration from the filter media, while the PBT/TPU adhesive alloy is primarily intended as an adhesive coating. Speed of the first filter media layer passing the adhesive alloy fiber formation determines the amount of fiber per unit area collected on the previously formed first filter media layer. Only enough adhesive alloy to form a substantial bond is required and about 20 gsm to about 25 gsm is deposited. The first filter media layer may be a single or multiple layers of material with similar of greater weight per unit area and the adhesive alloy fiber mat is deposited on this media. The complexity and number of layers of the first filter media layer may make it beneficial to bond together various sub-layers of the first or second filter media layers and this may be done in conjunction with the adhesive alloy layer using a rotating engraved pattern roll and ultrasonic horns that apply energy to melt sub-layers of the first or second filter media layer together in a pattern matching the engraved roll. The adhesive alloy layer is applied to the side of this composite. This occurs prior to bonding of the first filter media layer to the second filter media layer using the adhesive alloy layer.

The first filter media layer as formed above is either rolled into a master roll or continues to an additional processing step. In this next processing step the surface of the media which has been covered with fibers formed of the adhesive alloy is re-heated to soften the fibers without completely melting the fibers at a temperature of about 180 degrees Celsius to 200 degrees Celsius. The temperature is kept below about 210 degrees Celsius to 220 degree Celsius range in order to avoid any impact to the structure or fibers the first or second filter media layers. This is done with radiant heat energy or radiant heat assisted by low velocity moving air in close proximity to the surface of the first filter media layer with the adhesive alloy layer.

Immediately upon reaching the prescribed surface temperature and softening of the adhesive alloy fibers, the first filter media layer is placed on contact with another roll of previously manufactured second filter media layer and pressure is applied. As described herein, the second filter media layer is produced on a paper machine and is primarily composed of cellulose fibers but may contain other natural or synthetic fiber and resins. Heating and re-activating the adhesive alloy fiber allows bonding of the first and second filter medial layers without the use of any additional glue or materials while preserving the function and performance of the first and second filter media layers to which the adhesive alloy is applied. The heating step may alter the adhesive alloy but not significantly or to the extent that the initially formed adhesive alloy fibers retain their basic morphology and impart little or no impact to the performance of the final composite other than providing adhesion of the dis-similar materials.

Melting Characteristics of TPU

Figure 5:
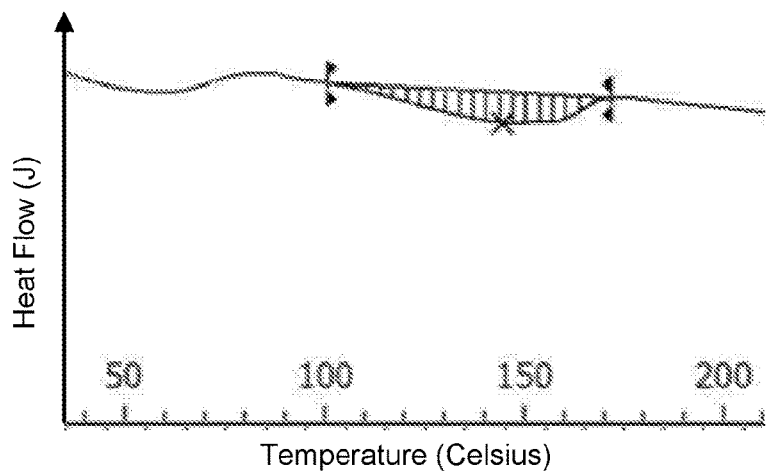
FIG. 5 is a differential scanning calorimetry curve of thermoplastic polyurethane (TPU).
Figure 6:
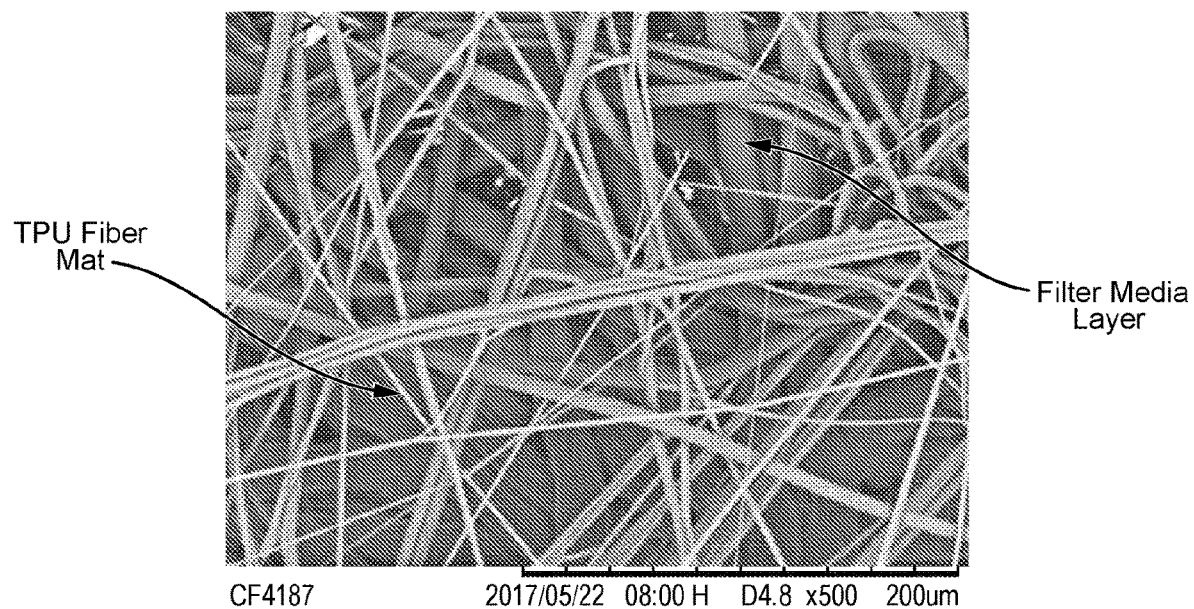
FIG. 6 is scanning electron micrograph (SEM) image of a melt blown TPU layer disposed on a filter media layer.

FIG. 5 is a DSC curve of a TPU showing that the TPU starts to melt and flow at a temperature about 150 degrees Celsius. In the example given with PBT and TPU blended where the PBT has a melt point in excess of 300 degrees Celsius and the TPU a melting point above about 130 degrees Celsius, the onset and range of the softening region has been tailored for its specific end use in fuel with a maximum service temperature of about 150 degrees Celsius. FIG. 6 is a SEM image of TPU fibers melt blown on to PBT filter media layer. Large variation in TPU fiber size from 1.5 microns to 15 microns is observed.

Thermal Activation of TPU/PBT Adhesive Alloy

FIG. 7A is a SEM image of a melt blown TPU/PBT adhesive alloy layer including a plurality of TPU/PBT fibers disposed on a PBT filter media layer at room temperature. The amount of TPU in the adhesive alloy is 40 wt %. FIG. 7B is a SEM image of the TPU/PBT adhesive alloy layer heated to a temperature of 170 degrees Celsius. At this temperature, the adhesive alloy fibers soften and are thermally activated to have adhesiveness, but there is very little change in the morphology of the PBT/TPU adhesive alloy fibers. FIG. 7C is a SEM image of the TPU/PBT adhesive alloy layer heated to a temperature of 180 degrees Celsius. At this temperature, various fibers of the TPU/PBT adhesive alloy layer start to melt and join together while still retaining some of its initial morphology. FIG. 7D is a SEM image of the TPU/PBT adhesive alloy layer heated to a temperature of 190 degrees Celsius. At this temperature, the adhesive alloy fibers completely melt and merge together such that interconnected patches of melted adhesive alloy remain on the filter media layer. These figures illustrate that while the DSC curve of FIG. 5 shows the softening of the alloy to begin just below or at about 150 degrees Celsius, there is little loss of fiber morphology below about 180 degrees Celsius. This illustrates an advantage in that the alloy can be engineered to soften and bond media layers before there is any substantial change of the structure.

As used herein, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter media, comprising:
   a first filter media layer;
   a second filter media layer;
   a first adhesive alloy layer comprising a first adhesive alloy disposed between the first filter media layer and the second filter media layer, the first adhesive alloy comprising:
      a thermally activated adhesive having a first melting temperature, and
      a polymer blended with the thermally activated adhesive, the polymer having a second melting temperature greater than the first melting temperature,
      wherein a ratio of the thermally activated adhesive in the first adhesive alloy is in a range of 5 wt % to 70 wt %; and
   a second adhesive alloy layer comprising a second adhesive alloy disposed on the first adhesive alloy layer, the second adhesive alloy comprising:
      the thermally activated adhesive having the first melting temperature, and
      the polymer blended with the thermally activated adhesive, the polymer having the second melting temperature,
      wherein a ratio of the thermally activated adhesive in the second adhesive alloy is in a range of 5 wt % to 70 wt %;
   wherein the ratio of the thermally activated adhesive in the second adhesive alloy is greater than the ratio of the thermally activated adhesive in the first adhesive alloy,
   wherein the first adhesive alloy layer is different from the second adhesive alloy layer and the first adhesive alloy is different from the second adhesive alloy, and
   wherein the first adhesive alloy layer and the second adhesive alloy layer have a first porosity that is greater than a second porosity of the first filter media layer or the second filter media layer.

2. The filter media of claim 1, wherein the thermally activated adhesive comprises thermoplastic polyurethane.

3. The filter media of claim 1, wherein the first adhesive alloy has an alloy melting temperature greater than the first melting temperature but less than the second melting temperature.

4. The filter media of claim 3, wherein the first adhesive alloy has an alloy softening temperature less than the alloy melting temperature, and wherein heating the first adhesive alloy to the alloy softening temperature causes the first adhesive alloy to be adhesively bondable to a substrate.

5. The filter media of claim 1, wherein the polymer comprises polyamide, aliphatic polyamide, aromatic polyamide, polysulfone, cellulose acetate, polyether sulfone, polybenzimidazole, polyetherimide, polyacrylonitrile, poly(ethylene terephthalate), polypropylene, polyaniline, poly(ethylene oxide), poly(ethylene naphthalate), poly(butylene terephthalate), styrene butadiene rubber, polystyrene, poly(vinyl chloride), poly(vinyl alcohol), poly(vinylidene fluoride), poly(vinyl butylene), polyphenylene sulfide, liquid crystal polymer, copolymers or derivatives thereof.

6. The filter media of claim 5, wherein the polymer comprises poly(butylene terephthalate).

7. The filter media of claim 1, wherein the first porosity is an order of magnitude greater than the second porosity.

8. The filter media of claim 1, wherein the first adhesive alloy layer and the second adhesive alloy layer are configured as non-woven mats.

9. The filter media of claim 1, wherein the first adhesive alloy layer and the second adhesive alloy layer comprise a plurality of fibers.

10. The filter media of claim 9, wherein each fiber of the plurality of fibers has a diameter in a range of 0.5 µm to 50 µm.

11. The filter media of claim 9, wherein each fiber of the plurality of fibers has a diameter in a range of 1 µm to 30 µm.

12. The filter media of claim 1, wherein the first adhesive alloy layer and the second adhesive alloy layer have a thickness of less than 100 µm.

13. A filter media formed by a process comprising:
   mixing a first amount of a thermally activated adhesive with a polymer to form a mixture;
   at least one of dry blending or compounding the mixture to form a first adhesive alloy;
   melt blowing the first adhesive alloy onto a surface of a first filter media layer to form a first non-woven adhesive alloy layer disposed on the first filter media layer;
   melt blowing a second adhesive alloy comprising a second amount of the thermally activated adhesive and the polymer onto a surface of the first adhesive alloy to form a second non-woven adhesive alloy layer disposed on the first adhesive alloy;
   heating at least the first non-woven adhesive alloy layer to a temperature greater than a softening temperature of the first adhesive alloy but lower than a melting temperature of the first adhesive alloy;
   disposing a second filter media layer over the second non-woven adhesive alloy layer; and
   cooling the first non-woven adhesive alloy layer to a temperature below the softening temperature of the first adhesive alloy, causing the first non-woven adhesive alloy layer to harden and bond to each of the first filter media layer and the second adhesive alloy,
   wherein a ratio of the thermally activated adhesive in the first adhesive alloy is in a range of 5 wt % to 70 wt %, wherein a ratio of the thermally activated adhesive in the second adhesive alloy is in a range of 5 wt % to 70 wt %, wherein the ratio of the thermally activated adhesive in the second adhesive alloy is greater than the ratio of the thermally activated adhesive in the first adhesive alloy, wherein the first adhesive alloy is different from the second adhesive alloy and the first non-woven adhesive alloy layer is different from the second non-woven adhesive alloy layer, and wherein the first adhesive alloy layer the second adhesive alloy layer have a first porosity that is greater than a second porosity of the first filter media layer or the second filter media layer.

14. The filter media of claim 13, wherein the thermally activated adhesive comprises thermoplastic polyurethane and the polymer comprises poly(butylene terephthalate).

* * * * *